(No Model.) 3 Sheets—Sheet 1.

J. WRIGLEY.
FEED TABLE GAGE FOR CURVED WORK.

No. 273,000. Patented Feb. 27, 1883.

INVENTOR
John Wrigley
by Jacob J. Storer
ATTORNEY

Wm. A. Lowe
W. Scarborough
WITNESSES

J. WRIGLEY.
FEED TABLE GAGE FOR CURVED WORK.
No. 273,000. Patented Feb. 27, 1883.
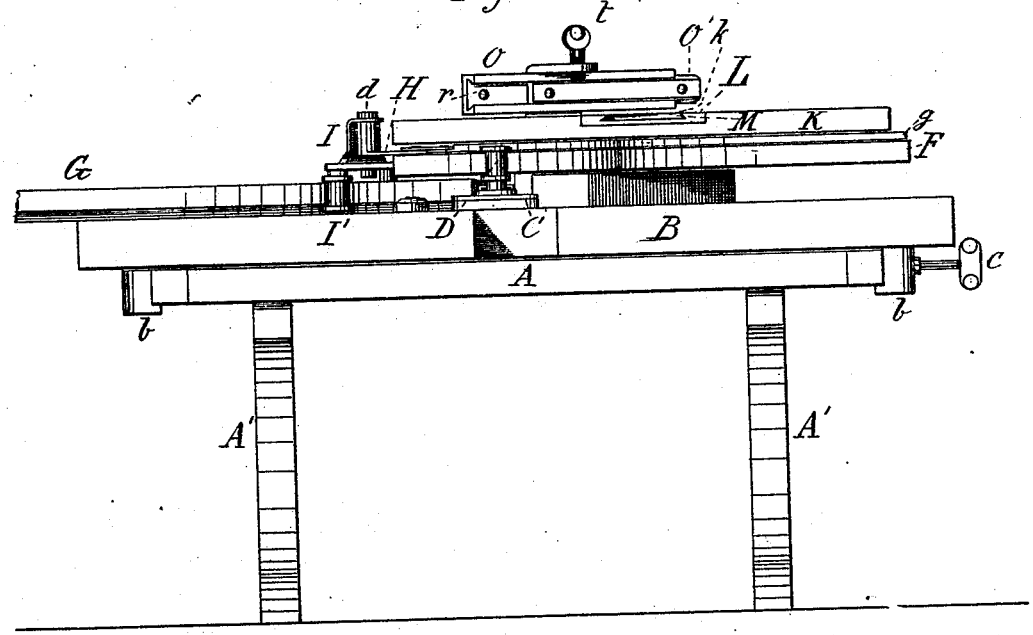
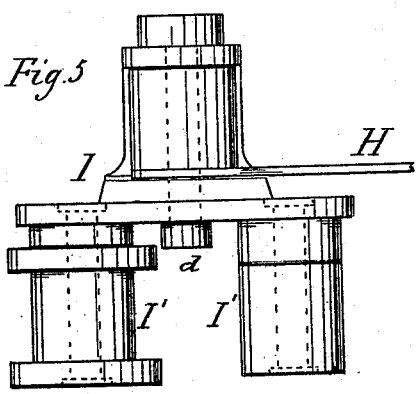
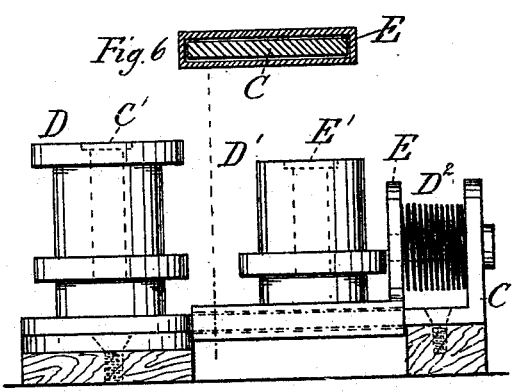

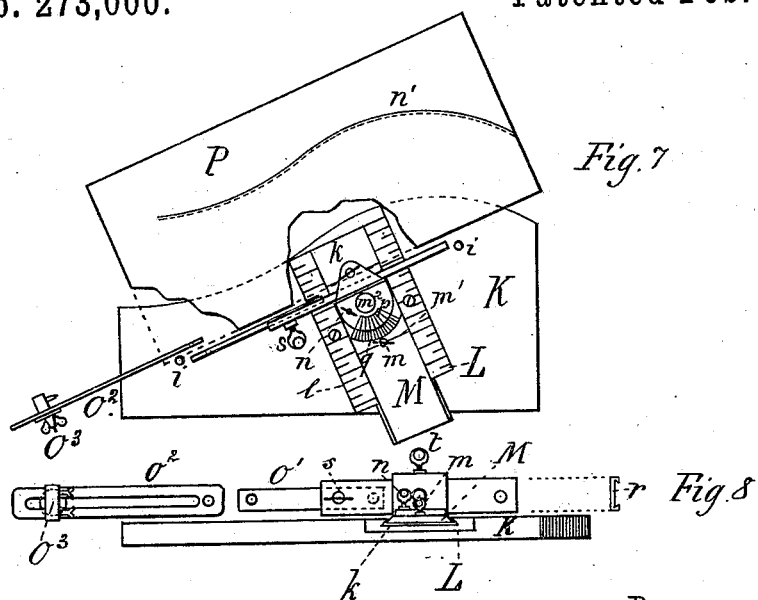

UNITED STATES PATENT OFFICE.

JOHN WRIGLEY, OF ELMIRA, NEW YORK.

FEED-TABLE GAGE FOR CURVED WORK.

SPECIFICATION forming part of Letters Patent No. 273,000, dated February 27, 1883.

Application filed July 24, 1882. (No model.)

*To all whom it may concern:*

Be it known that I, JOHN WRIGLEY, a citizen of the United States of North America, and a resident of Elmira, county of Chemung, State of New York, have invented a new and useful improvement in devices for feeding boards, sheet metal, &c., to cutting-tools for the purpose of cutting or multiplying shapes or blanks, and in the method of forming guiding-tracks for the patterns, of which the following is a specification.

My invention relates to improvements in pattern-feeding machines for saws and other cutters.

The object of this invention is to provide a machine whereby any desired number of pieces of a given shape or pattern, having straight, curved, or irregularly-shaped edges, may, in constant succession, be accurately sawed or cut from lumber, sheet metal, card-board, leather, and the like without outlining the pattern on the material from which the pieces are to be cut, whereby the labor—the most considerable item of cost—in multiplying pieces of a certain shape is greatly diminished and more accurate work is insured.

The invention consists of the combination, with a movable pattern, of guide-rolls and a guiding-track, and of novel devices for adjusting the material to be cut; and, further, of a method of forming the tracks for the patterns, all of which will be hereinafter set forth.

Reference is to be had to the accompanying drawings, forming part of this specification, in which similar letters of reference indicate corresponding parts in all the figures.

Figure 1:
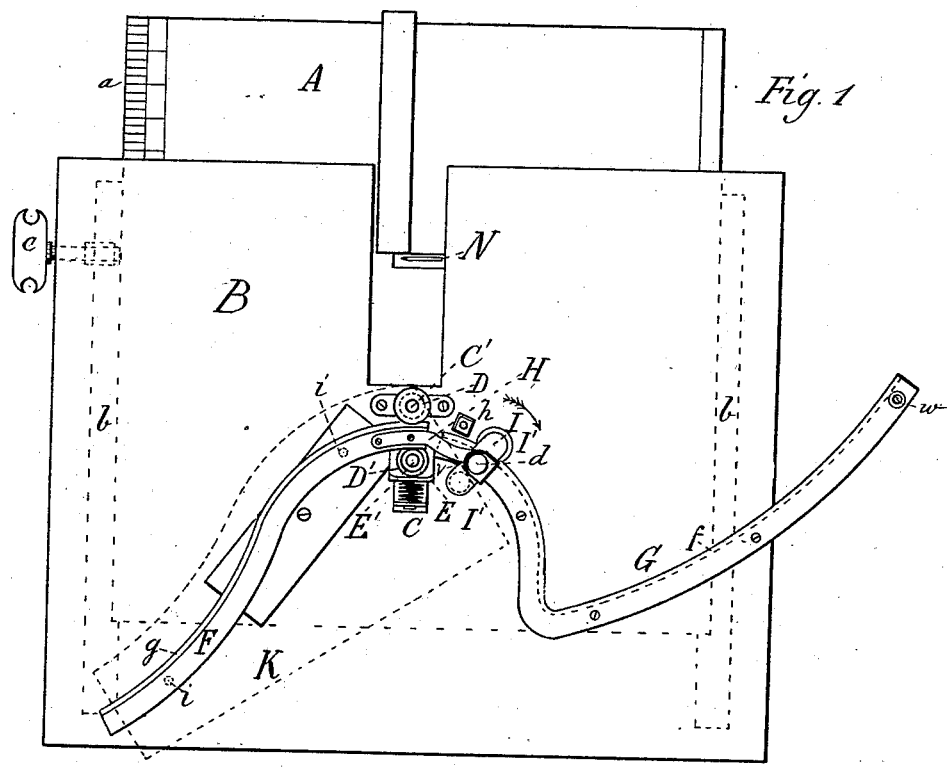
Figure 2:
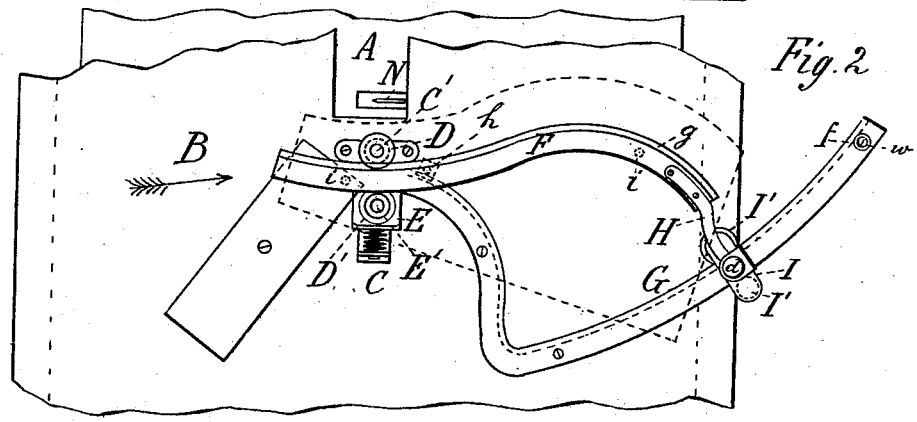
Figure 3:
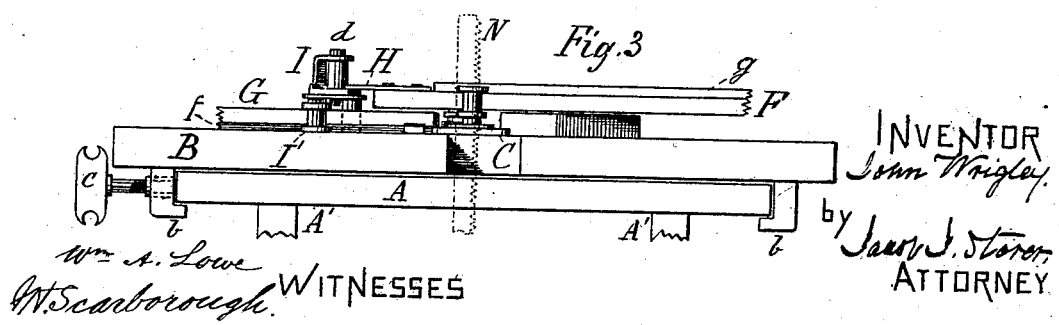

Figure 1 is a plan of my improved device, showing a movable clamp-support in dotted lines, in position for the commencement of an ogee or doubly-curved cut, and showing also the pattern and track for forming such a cut or outline. Fig. 2 is a partial plan of the same, showing in dotted lines the position of the clamp-support and pattern when the cut is nearly completed. Fig. 3 is a front elevation of the device. Fig. 4 is an end elevation of the same. Fig. 5 is an enlarged elevation of the clamp-rollers and their plates. Fig. 6 is an enlarged elevation of the track guide-rollers. Fig. 7 is a plan of the clamp in position on the clamp-support, holding a board in position for feeding to the saw or cutter for cutting an ogee or double curve. Fig. 8 is an enlarged rear elevation of the clamp and extension thereof in position. Fig. 9 represents, on the left, a pattern for cutting a segment of an oval or ellipse, and on the right the guiding-track therefor. Fig. 10 represents the pattern and track for a segment of a circle. Fig. 11 represents the pattern and track for an irregular curved line.

In the drawings, A represents a saw or cutter table, supported on legs A', and having graduations marked on it at one edge, as shown at $a$. This table A is designed to support the saw, cutter, or other tool to be used.

Secured on the top of the table A by grooved strips $b$, in such a manner that it can be adjusted back and forth, is the sliding platform B, which can be adjusted in suitable position relatively to the saw or other tool by means of the graduations $a$, and held by set-screw $c$, that is entered through a strip, $b$, against the table A.

Rigidly fixed on top of the platform B is an angle-plate, C, supporting a vertical spindle, C', on which is a revolving spool, D; and adapted to slide on the plate C is an angle-plate, E, supporting a spindle, E', on which is a revolving spool, D'. A spring, $D^2$, fixed between the upturned ends of the plates C E, tends to keep the spool D' pressed toward the spool D, so that the two spools may securely grasp and at the same time guide the pattern that may be passed between them.

F F F F represent patterns, of wood or other suitable material, whose edges are parallel and conform in outline with the outlines of the articles that are to be sawed, cut, or planed by pattern; and G G G G represent guiding-tracks for controlling the directions to be taken by the feed ends of the patterns when the device is in operation.

In Figs. 1, 9, 10, and 11 patterns of various shapes are shown, each with its especial guiding-track.

Attached to the feed end of a pattern F by a forward-projecting arm or prolongation, H, and swiveled on the outer end of said arm by a vertical pin, $d$, is a frame, I, carrying two depending spools or rollers, I', that are designed to grasp the track G, and thereby prevent erratic movements of the said pattern F. One of these rollers, I', is preferably flanged to assure a better hold on a track G, which is also preferably correspondingly grooved, as shown at $f$, throughout its length; and also one of the rollers D D' is preferably flanged, the better to hold the pattern F passing between them, the pattern being also correspondingly grooved, as shown at $g$. The track G being secured in position on the platform B, as shown in Figs. 1 and 2 on the correct lines of direction, and the rollers I' being set astride said track, the pattern F is then entered between the guide-rollers D D' in the direction contrary to that of the arrows, Figs. 1 and 2, and is pushed up until a roller, I', comes in contact with a stop, $h$, on the platform B. Then on top of the pattern F the clamp-support K is secured by screws $i$ or other devices, the front edge of said support K being shaped to conform in general outline with the edge of the pattern F, so that its edge shall not come in contact with the operating saw or other tool. This clamp-support K has sunk immovably into its face and flush therewith a channeled plate, L, which is graduated in inches and fractions of an inch on its surface, as shown at $l$.

In the channel $k$ of the plate L is a sliding plate, M, which may be held at any desired point by a set-screw, $m$, a line, $m'$, on said sliding plate enabling the operator to adjust it accurately by the graduations $l$ toward or from the tool N, which is fixed on or in the table A. On this plate M a clamp, O, is pivoted on a vertical pivot, $m^2$, so that it can be made to swing horizontally to either side, while a set-screw, $n$, is designed to hold said clamp O firmly in the adjusted position. Radial graduation-lines $p$ on the clamp and corresponding lines, $q$, on the plate M enable the operator to accurately adjust the said clamp at any desired angle, so as to present the wood or other material to be operated upon at the proper angle to the operating tool.

In a groove or channel, $r$, extending along the face of the clamp O is a slide, O', which may be held fixed by a set-screw, $s$, and this slide O' may be drawn out and have an extension, O², provided with toe and set-screw O³ attached to it for better insuring the steadiness of the board or other article held by said clamp.

The parts being in position shown in Fig. 1, a board or other article, P, that is to be cut is secured in the clamp O by a set-screw, $t$, as shown in Fig. 7, the clamp-extension O² being brought into use, if desired. Then the platform B is moved toward the saw or tool N, and the clamp O is adjusted so as to bring the feed end of said board P against the tool N, with the cutting-edge of the latter in line with the direction of the cut to be made. Then the saw or other tool being put in motion, the operator pushes the board or sheet P against the tool, and the pattern F is thereby moved along in the direction of the arrows, Figs. 1 and 2, between the rollers D D', with its forward end guided on the track G, whereby the said board or sheet P is so moved against the tool N that the latter cuts the outline of the pattern F, as indicated at $n'$, Fig. 7. A stud or cross-bar, $w$, on or near the extreme end of the track G, keeps the track-rollers I' from running off the track at that end.

The method of forming or shaping the guiding-track G is as follows: A pattern F is prolonged in a line drawn from the center of its feed end by an arm, H, through the free end of which a hole, $v$, is formed. A pencil then being held upright in the hole $v$, with its point resting on a plane surface, the pattern is fed or pushed forward, with its front edge always in contact with a fixed stop, and if the said pattern be moved along steadily without lateral deviation of its feed end from the true line it will be found that the line traced by the pencil will serve as the center-line of the guiding-track that must be used for accurately guiding the end of the said pattern as it is fed through the rollers D D' for guiding the board or sheet against the cutting-tool. In other words, the guiding-track for each pattern is defined or ascertained by the movement or direction taken by the feed end of the pattern as the latter is fed against the cutting-tool.

It is manifest that without a guiding-track the feed end of a pattern would, as the pattern was fed through the guiding-rollers, constantly incline to deviate in one or the other direction from the true line, and consequently the cutting-tool used would not follow the pattern-outline; or, in other words, without an end-guiding track G a pattern F, when fed along between the guide-rollers D D', would swing horizontally, as on a pivot, and hence would not properly present the material to be operated upon to the saw or other tool. It will be seen that in this device the line of direction taken by the track-rollers' swivel $d$ determines the shape of the guiding-track in each case. The arm or prolongation H serves also another purpose. It carries the track-rollers I', which grasp the track and swing in one or the other direction on turning the track curves, thereby insuring the free, easy, regular, and continuous motion of the pattern as it is fed. Instead of providing each pattern with its special arm and track-rollers, one arm with track-rollers may be made to serve for all patterns, as it can be adjusted and secured to a pattern at any desired angle.

I do not know of any rule in mathematics by which a correct guiding-track can be deduced from any given pattern. Hence I am unable to make as brief explanation of my method of track-forming as might be desirable.

As one cut is made in the board P that is being operated upon the pattern F is drawn back through the rollers D D', and the sliding plate M is then loosened, moved the desired distance toward the cutting-tool, which distance can be correctly determined by the graduations $l\, m'$, and tightened in place again by set-screw $m$, and then the said pattern F is again pushed forward through the rollers D D', thereby feeding the board P against the tool for another cut, and these movements are repeated until all the desired shapes that can be got from the board have been cut.

Any one pattern may be used for cutting many sets of shapes or blanks from the material to be operated on. One set may be cut with the pattern in its normal position and another by turning both pattern and track upside down and operating with them in such position, and when the parts are in this latter position the inward curves formed on the blanks or shapes cut will be smaller and the outward curves be larger; also, by swinging the clamp O in either direction and in any measure so as to change the angle of presentation of the pattern and the material to be operated on to the cutting-tool, blanks of various other shapes or outlines may be cut; and it will be seen that by the adjustment of the said platform B toward or from the tool N the relative positions of said tool and of the rollers D D', that serve as pivots for the pattern in use, are changed, so that when using a pattern having certain curves the shapes or blanks cut by it will have curves of greater sweep when the pivot rollers D D' are withdrawn from the cutting-tool than when they are, by the adjustment of the platform, advanced toward said tool. Hence the adjustability of the platform may be a matter of great importance in many instances. Other advantages of the adjustable platform B are that it supports the entire device and can readily be set in place on the saw or tool table A or be removed therefrom, with all its attachments in place, when it is desired to do other work on the table.

It is sometimes desirable when doing heavy work to apply other than manual power for feeding the material to the saw or other tool, in which case I fix a toothed rack along the front edge of the pattern and feed and withdraw the pattern and the material carried by it by means of a cog-wheel geared with the said rack and driven by any suitable power.

Having thus described my invention, I claim as new and desire to secure by Letters Patent—

1. In pattern-feeders, the combination of the fixed table A, graduated upon one side and provided with slot for the cutting-instrument, and the slotted sliding table B, bearing the feeding mechanism and provided upon its edges with angle-flanges b, bearing set-screws c, substantially as described, whereby the width of the article to be cut is regulated, as set forth.

2. The combination, with the table B and the fixed spools D D', of the feed-pattern F, guide-tracks G, and movable rolls I', as and for the purposes specified.

3. The combination, with the table B, feed-pattern F, guide-tracks G, and rollers I', of the arm H, pin d, and frame I, substantially as described, whereby the article to be shaped is guided, as set forth.

4. The combination, with the feed-pattern F, rolls I', and track G, of the clamp-support K, secured to said feed-pattern, and having its inner edge conformed in outline to said pattern, substantially as and for the purposes described.

5. The combination of fixed table A, sliding table B, track G, rolls D D', feed-pattern F, arm H, frame I, rolls I', and clamp-support K, bearing clamping devices, all arranged in the manner and for the purposes set forth.

In testimony that I claim the foregoing as my invention I have signed my name, in presence of two witnesses, this 18th day of July, 1882.

JOHN WRIGLEY.

Witnesses:
J. M. RAE,
JAMES POWELL.